Sept. 4, 1962     O. H. CRITCHLEY ETAL     3,052,116
VIBRATING STRAIN GAUGES
Filed Aug. 10, 1959     3 Sheets-Sheet 1
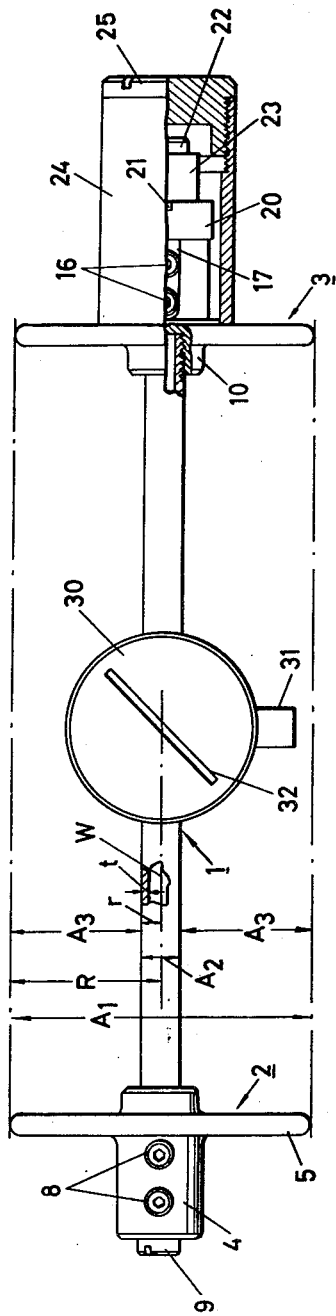
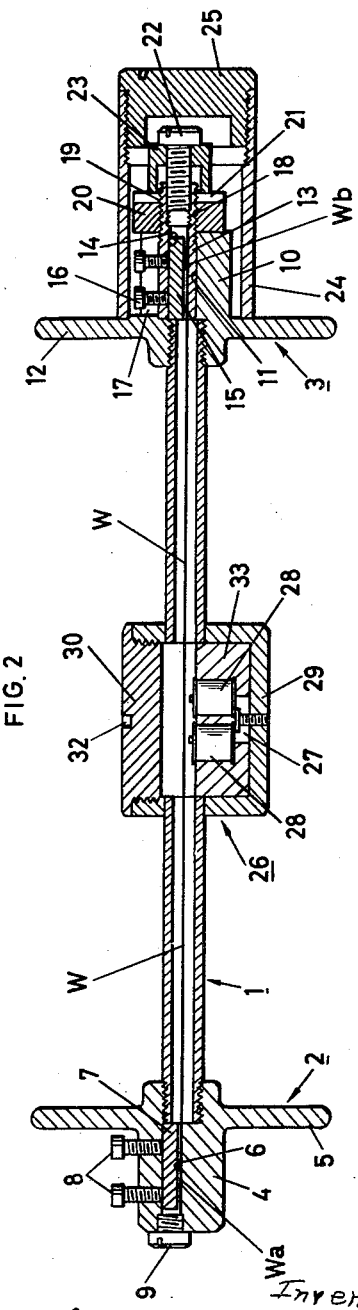
Inventors
Octavius Hunt Critchley
Kenneth Barron
William Harold Keller
By Stevens Davis Miller & Mosher
Attorneys

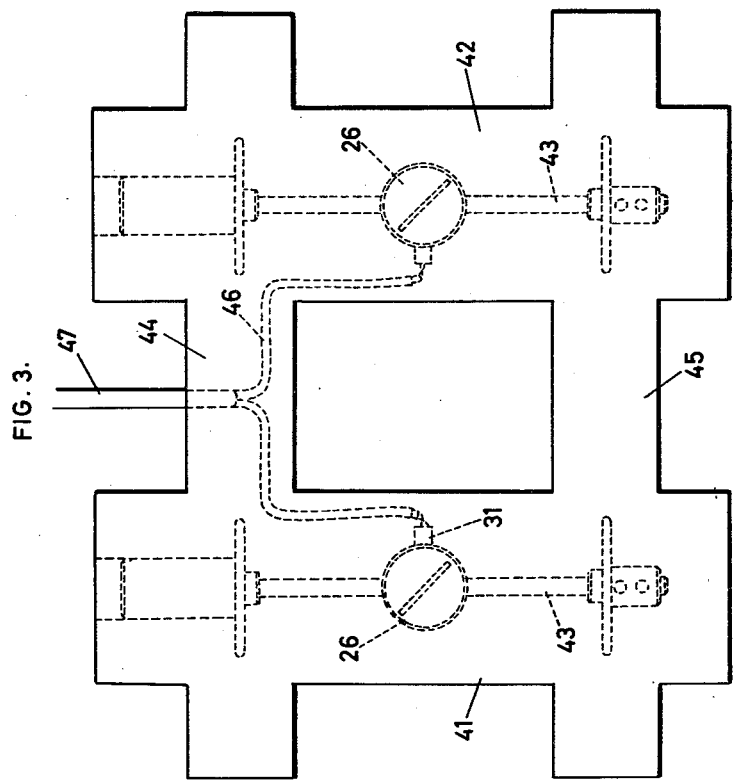

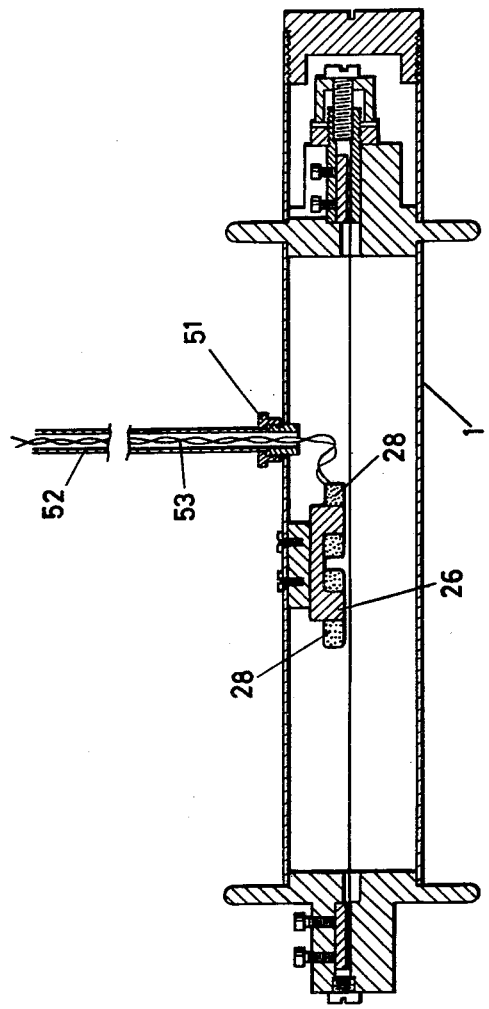

United States Patent Office 3,052,116
Patented Sept. 4, 1962

3,052,116
VIBRATING STRAIN GAUGES
Octavius Hunt Critchley, Hounslow, Kenneth Barron, New Southgate, London, and William Harold Kellet, Whitton, Twickenham, England, assignors to Coal Industry (Patents) Limited, London, England, a company of Great Britain
Filed Aug. 10, 1959, Ser. No. 832,698
Claims priority, application Great Britain Aug. 25, 1958
2 Claims. (Cl. 73—88.5)

This invention relates to vibrating wire strain gauges for embedment in structures fabricated from concrete or similar plastic material which sets hard after moulding, and particularly, although not exclusively, to such gauges where a useful life of up to two decades or more may be required. Gauges of this type are used to measure changes in strain due to variations in the loading to which the structure is subjected and other dimensional changes that may occur upon ageing of the material of the structure.

It is well known that the natural frequency of vibration of a wire held in tension between two supporting end clamps, varies rapidly as the spacing between these supports is changed. This property may be used for the measurement of strain by attaching the supporting end clamps directly to the structure in which it is wished to study the strain variations and the property may be expressed functionally by an expression derived from Mersenne's and Hook's laws. If the structure is fashioned from a plastic material, such as concrete, that sets hard after moulding, the wire and its supports may be embedded in the structure. To measure the strain variations, it is necessary only to set the wire vibrating and to determine the resulting changes in the natural frequency of vibration of the wire. This may be done by mounting close to the wire a small U-shaped permanent magnet assembly upon the limbs of which are wound coils of insulated copper wire. If an electric current pulse is passed through the coil the strength of the polarising magnet field is altered and the tensioned strain measuring wire, which is part of the magnetic circuit, experiences a force normal to its axis and is set into vibration. These vibrations alter the reluctance of the magnetic circuit and so change the flux linking the coil, with the result that an alternating E.M.F. is generated having a frequency which is equal to the natural frequency of the wire.

The application of vibrating wire strain gauges to the problem of determining strain in a structure fabricated from concrete or similar plastic material which sets hard after moulding, has already been proposed. In such application, the gauge is embedded in the structure and comprises a wire held by end clamps attached to flat plates or discs arranged with their planes normal to the axis of the wire. These end plates are held firmly by the structural material in which they are embedded and transmit movements in the material to the end clamps with negligible loss. Protection against damage is afforded to the wire of the gauge by a tube which surrounds the wire and which is fixed to the end plates. It has heretofore been assumed that it is necessary to ensure that the tube does not inhibit the movement between the end plates and it has previously been proposed to make this tube telescopic or to form the tube of some material which is much weaker than the material of the structure in which it is set.

However, the known gauges suffer from the disadvantages that they do not effectively and persistently exclude moisture from the wire over the long period of time for which the strain gauge is expected to remain in accurate use, particularly when the strain gauge is to be embedded in damp or wet structures, and that it is not possible to adjust the initial or zero frequency of the string immediately prior to its embedment in the structure. A further serious disadvantage is the delicacy of construction of the previously proposed types of gauges which makes them inconvenient to handle, particularly in field conditions. The telescopic tube type of gauges also fails because it is not possible effectively to seal the joint between the tube parts, and the other type above mentioned often fails because the material of which the tube is made is not durable. After the gauge has been made up and is ready for use, there has also previously been no means provided for the adjustment of the natural frequency of the wire to the desired initial reference or zero level of frequency.

The present invention provides a vibrating wire strain gauge for embedding in a structure fabricated from concrete or similar material capable of setting hard, comprising a metal tube which extends between a pair of flanges and encloses a wire of ferro-magnetic material sealed in the gauge, and an electro-magnet adjacent the wire, in which the gauge is constructed in accordance with the formula:

$$r = t[\xi + \sqrt{\xi(\xi-1)}]$$

where $r$, $t$, and $\xi$ have the values assigned to them in the foregoing description.

The matching of the composite elastic modulus of the whole gauge to that of the material is achieved by a judicious choice of the ratio of the wall thickness of the tube to the diameter of the tube, of the radius of end discs incorporated in the gauge, and of the elastic modulus of the material of which the tube is formed. The manner of calculation of the desired design parameters of the gauge are hereinafter described.

According to a further feature of the invention, means are provided by which the tension of the wire can be adjusted so that the initial or zero reference frequency of the wire can be adjusted immediately prior to its embedment in the structural material. This is achieved by designing one of the end clamps to include a vernier screw which may advantageously be covered by a protective cap to keep out moisture.

By way of example, the invention will be hereinafter described with reference to the accompanying drawings in which, FIGURE 1 is a plan view partly in section of one form of gauge constructed according to the present invention, FIGURE 2 is a longitudinal cross-sectional view of the gauge of FIGURE 1, FIGURE 3 shows two gauges embedded in a block prior to final embedment in a structure, and FIGURE 4 shows an alternative form of gauge.

As shown in FIGURES 1 and 2 of the accompanying drawing, the vibrating wire strain gauge comprises a brass protective tube 1 of 0.25 inch diameter and a wall thickness of 22 S.W.G., the tube 1 extending between end members 2 and 3 and a wire W which is a high grade musical string of silver plated steel 0.010 inch in diameter, and which extends axially through the tube 1 between the end members 2 and 3.

The end member 2 is formed by a hub portion 4 and an integral flange 5 two inches in diameter. Through the hub 5 extends a non-axial bore 6 in which is situated a clamping block 7 between which and the wall of the bore 6 is clamped one end Wa of the wire W, the block 7 being held in clamping position by screws 8. The outer end of the bore 6 is closed by a plug 9 to prevent ingress of moisture and dirt into the tube 1.

The end member 3 is also formed by hub portion 10 provided with a non-axial bore 11 extending therethrough and an integral flange 12 also two inches in diameter. Axially slidable within the bore 11 is a clamping element 13 having axially extending therethrough a bore 14. The other end $Wb$ of the wire $W$ is clamped within the bore 14, similar to the manner in which the end $Wa$ is clamped within the bore 6, by means of a clamping block 15 and screws 16 which slide with the element 13 in an axially extending slot 17 in the hub 10. The outer end of the element 13 is provided with an internal screw thread 18 and an external screw thread 19. Meshing with the thread 19 is a nut 20 which bears against the outer end of the hub 10 and by which the axial position of the element 13 relative to the hub 10 can be adjusted to set the tension in the wire W. The nut 20 which is provided with a transverse slot 21 on its outer face to facilitate rotation of the nut, can be locked in the desired position after adjustment of the tension in the wire W by means of a screw 22 which passes through a bridge 23 bearing against the outer face of nut 20, and which meshes with the thread 18 in the element 13.

The outer end of hub 10, the nut 20, the bridge 23 and the screw 22 are surrounded by a shell 24 the inner end of which is welded to the outer face of flange 12 and the outer end of which is closed by a screw cap 25, the shell 24 serving to prevent the ingress of moisture and dirt into the tube 1.

Midway along the length of the tube 1 is located an exciter unit 26 comprising a U-shaped permanent magnet 27 of which each of the pole pieces is surrounded by coil 28 of 150 ohms resistance. The free end of each of the pole pieces is located adjacent the wire W. The magnet 27 and coils 28 are housed in a brass box 29 welded to the tube 1, the box 29 being provided with a set screw cap 30 and an outlet 31 through which can be passed the leads to the coils 28. The cap 30 is provided with a transverse groove 32 by which the cap 30 can be tightened and released. The magnet 27 and coils 28 are embedded in a mass 33 of suitable resin.

All exposed parts of the gauges are nickel plated to inhibit corrosion.

The active length of the wire W is 5.25 inches.

The gauge may be used directly in the material of a structure, but for rougher use, such as it may experience on a constructional site, it may be desirable to precast the gauge in a block of this material. For this purpose, the gauge is assembled and placed in a small mould. The cap 25 on the end of shell 24 is replaced by a longer blanking off rod which is screwed into the end of shell 24 and projects from the mould. After the material has set and the block has been removed from the mould, the rod is unscrewed from the shell 24. By this artifice, an access hole is left in the block to provide access to the nut 20 for the purpose of adjusting the tension of the wire W.

FIGURE 3 shows one form of block in which is moulded a pair of gauges each constructed as above described. The block comprises two main portions 41 and 42 in each of which is embedded a strain gauge 43 and which are interconnected main portions by a pair of web portions 44 and 45. Through the web portion 44 extends a conduit 46 which connects at each end with the outlet 31 of the respective gauge, a second conduit 47 connecting with the conduit 46 and projecting out of the web portion 44. Through the conduits 46 and 47 the electrical leads pass to the exciter units 26 of the gauges.

The procedure for designing a vibrating wire strain gauge unit of the above type so that it is matched to the material into which it is going to be embedded is best described by the means of an example. It is necessary to have end flanges which are of sufficient diameter to be gripped well by the concrete or other mass of structural material, but they must not be so large as to produce an appreciable local change in the nature of the material. Again, the diameter of the tube protecting the wire must be adequate to meet the criteria for matching of elastic moduli set out below but it must also have sufficient length so as to meet the requirement that the length of the gauge be large compared to its diameter. On the other hand, it is desirable that the frequency of vibration of the gauge lie in the region of high aural sensitivity as this has several important advantages, and this puts a limit on the overall length of the gauge, as the natural frequency of vibration falls inversely with the length of the string. Because the well known techniques for the transmission, amplification and measurement of audio frequencies have been influenced by the arts of speech transmission in communications engineering and for which reason available equipment works well in the frequency band of 500 c./s. to 3,000 c./s., a gauge frequency in this range is desirable for efficient plucking and good output from a reasonably small magnetic system. Such output frequencies may be readily handled by simple electronic apparatus and so that it may be readily heard if it is desired to use aural methods for frequency determination.

Using an unloaded string, which has a frequency of vibrating lying in the range of 400 to 1200 cycles per second, the most convenient dimensions for the gauge are as stated above with respect to the apparatus shown in FIGURES 1 and 2.

It is further necessary, according to the present invention, to obtain a match between the effective elastic modulus of the gauge assembly and that of the structural material. This may involve a relation between these moduli and the diameter of the end flanges, the overall diameter of the protecting tube and its wall thickness as well as the material from which the tube is spun or drawn. Considering the general case, and referring to FIGURE 1, Let $E$ = the effective modulus of elasticity of the combination of the gauge and the structural material in which it is to be embedded, $E_c$ = the modulus of elasticity of said structural material, $E_m$ = the modulus of elasticity of the material from which the protecting tube has been fashioned, $E_m'$ = the effective modulus of elasticity of the protecting tube as a whole, $A_1$ = the total cross-sectional area of the end flanges, $R$ = the radius of the end flanges, $A_2$ = the overall cross-sectional area of the protecting tube, $r$ = the external radius of the protecting tube, $t$ = the wall thickness of the protecting tube and $A_3$ = the residual cross-sectional area from the outside of the protecting tube to the rim of an end flange.

Now, for ideal matching the effective modulus of elasticity of the material between the gauge flanges (i.e. concrete+metal tube) should have the same modulus of elasticity as concrete.

Ignoring the effect of the string, $$\text{Then } A_1E = A_2E_m' + A_3E_c \quad \text{(I)}$$

The relation between $E_m'$ and $E_m$ is $$E_m' = \frac{t}{r}(2r-t)E_m$$

$$\therefore R^2E = t(2r-t)E_m + (R^2-r^2)E_c \quad \text{(II)}$$

$$\frac{E_c r^2}{E_m} - 2tr + t^2 = 0$$

Let $$\xi = \frac{E_m}{E_c}$$

then, $$r^2 - 2\xi rt + \xi t^2 = 0$$

whence $$r = t[\xi \pm \sqrt{\xi(\xi-1)}] \quad \text{(III)}$$

From Equation (III) a number of important inferences may be drawn, namely:

(a) If $E_m < E_c$ that is if the structural material is stronger than the protecting tube, then $\xi$ is fractional and no solution is possible. This means that it is impossible to match the elastic moduli if the tube is made of material having an elastic modulus less than the concrete.

(b) If $E_m > E_c$ which will be the case with a protecting tube of steel, brass or some like alloy, then $\xi > 1$ and the only realisable solutions will be for $$r = t[\xi + \sqrt{\xi(\xi-1)}] \qquad (IV)$$

The conditions for an exact match may be calculated directly from (IV).

(c) Although R, the radius of an end flange does not appear in Equation (IV) and it would seem that this dimension has no significance as a design parameter, this is only true for conditions of an exact match of the elastic moduli. It is unlikely that an exact match will be obtainable because material of the precisely specified dimensions may not be available. Hence, the diameter of the flanges has significance as may be seen from Equation (II). The matter will be treated in more detail later, but in general the flanges should be as large as compatible with other design considerations.

Given the wall thickness of the brass tube 1, it is now possible to calculate the diameter of this tubing necessary to obtain a perfect match of the elastic moduli.

Let it be assumed that the wall thickness is 22 S.W.G. Take the elastic modulus of concrete, the structural material to be used $E_c = 4 \times 10^6$ p.s.i. and that of brass $E_m = 13.6 \times 10^6$ p.s.i.

Then, substituting in (IV), we have a value for $r$ of 0.175 inch. Hence, for perfect matching of the elastic moduli a brass tube of wall thickness 22 S.W.G. and of 0.35 inch diameter is required. However, it may not be possible to either obtain or use a tube of the prescribed size and, hence, it is necessary to examine the error introduced into the match if a tube of different size is used.

Assume, for instance, that a tube of 0.25 inch diameter only is available.

Consider again Equation (II) which may be re-written $$E' = \frac{t(2r-t)E_m + (R^2 - r^2)E_c}{R^2} \qquad (V)$$

where $E'$ is the effective modulus under the new conditions.

Then, in the case in point, $$E = 4.03 \times 10^6 \text{ p.s.i.}$$

The difference between this effective value and the modulus for concrete of $4 \times 10^6$ p.s.i. is negligible. However, examination of Equation (V) does indicate that it is desirable in this case for the radius of the end flanges to be as large as convenient, if it is not possible to meet the conditions for accurate matching. As the modulus of concrete is somewhat different in compression and tension, this is an important design consideration.

An error will be introduced into the embodiment of FIGURES 1 and 2 by virtue of the arrangement of the exciter unit 26 but in most instances this error will be of negligible proportions. However, apparatus can be constructed which eliminates even this error, by elimination of the exciter unit box, and one form of such apparatus will now be described with reference to FIGURE 4.

The embodiment of FIGURE 4 differs from that of FIGURES 1 and 2 only in the arrangement of the tube 1 and the exciter unit 26. In this embodiment the unit 26 is enclosed in the tube 1, the tube 1 being provided with an outlet 51 to which can be connected a conduit 52 for the passage into the tube 1 of the leads 53 to the coils 28 of the unit 26.

One example of the apparatus shown in FIGURE 3 and constructed in accordance with the present invention has the following specifications.

If tube 1 is constructed of 20 S.W.G. mild steel tube and has a wall thickness of 0.036 inch, the elastic modulus of mild steel, $E_m$, is taken as $30 \times 10^6$ p.s.i., and that of concrete $E_c$ is taken as $4 \times 10^6$ p.s.i., then $\xi = 7.5$ and the radius, $r$, to the outside of the tube may be calculated from equation (IV). This gives a tube radius of 0.522 inch or an outside diameter of 1.044 inch. The nearest stock size is $1\frac{1}{16}$ inch which is 1.063 inch. The discrepancy is only 0.019 inch, less than 2%. For end flanges of 2.00 inches diameter, the effective elastic modulus of the embedded gauge is $3.98 \times 10^6$ p.s.i. which does not represent a significant error.

In either of the above described embodiments the vibrating wire strain gauge may be pressurised to give added protection against ingress of moisture. In the embodiment of FIGURE 4, the conduit 52 may be used for pressurising the gauge. Under extremely wet conditions the conduit 52 may be of sufficient length to be accessible at the external surface of the structural material in which it is embedded and a pressure gauge may be attached to the end of the conduit to allow frequent checking of the pressure.

In the embodiment of FIGURE 4, two exciter units for exciting the wire into vibration may be used. With two exciter units placed at the quarter points of the wire, it is possible to obtain continuously sustained instead of plucked operation.

The manner of operation of either of the above described vibrating wire strain gauges is the same as that for the known instruments.

The wire frequency is measured either by comparison with another wire of variable frequency which is in continuously sustained oscillation, by comparison with an accurately calibrated variable frequency oscillator, or it is counted and timed by decade counting units.

The wire may be plucked by a direct current, or it may be excited sympathetically by pulsed alternating current derived from an A.C. measuring source. When the frequency of the alternating current exciting pulse is equal to that of the wire, the amplitude of the induced vibration in the wire is at a maximum. The frequency of the wire is measured as previously during the decay period after the exciting current has been cut off.

If two magnetic exciter units are provided, one of the units is connected to the input terminals of an A.C. amplifier and the other exciter unit is connected to the amplifier output. In this case, with the connections in the right sense and the gain of the amplifier sufficient to make the loop gain equal to unity, and if the phase delay in the circuit is small and constant, then the wire will be maintained in sustained oscillation at its natural frequency. The frequency of the continuously sustained oscillations of the vibrating wire of the gauge may then be determined by any convenient frequency measuring technique.

It is desirable that the gauge be independent of temperature variations. This may be almost perfectly achieved in both the embodiments of the invention in which, in the form illustrated, the residual temperature co-efficient is very small.

Consider the performance with the given temperature co-efficients for the case of the gauge of brass or steel construction embedded in concrete.

The respective temperature co-efficients of linear expansion are:

Concrete $6 \times 10^6$ per degree Fahrenheit (approx.) $\alpha_C$
Steel $6.8 \times 10^6$ per degree Fahrenheit (approx.) $\alpha_S$
Brass $10.4 \times 10^6$ per degree Fahrenheit (approx.) $\alpha_B$ The error introduced by temperature change will be due to differential linear expansion between the parts of the gauge. If all the temperature co-efficients are the same, there is no error.

There are three parts involved, namely, the vibrating wire, the tube and the concrete matrix cylinder defined by the end flanges.

Let the temperature rise by $\phi°$, then the steel wire will expand by $\phi\alpha_S$, and there would be a drop in the frequency of the vibration of the wire, if this movement was considered on its own.

However, the concrete between the end plates expands by $\phi\alpha_C$ which is less than $\phi\alpha_S$. This tends to pull the wire tight, but fails to do so by $(\alpha_S-\alpha_C)\phi$ and if the tube 1 did not exist there would be a consequent reduction in frequency of $\delta_f$. Nevertheless the protection tube cannot be ignored and as this in both cases $(\alpha_B>\alpha_S>\alpha_C)$ expands more rapidly than the concrete cylinder defined by the end plates, compensation or reduction of the temperature co-efficient is possible.

In the case of the first embodiment of the invention, the wire is enclosed in a brass tube. Now this has a temperature co-efficient of linear expansion $\alpha_B$ which is almost double that of concrete $\alpha_C$. The actual differential change of wire tension will be determined by the effective temperature co-efficient of linear expansion of the composite cylinder of concrete and brass. The concrete restrains the movement of the brass, but has a co-efficient less than that of the wire. By judicious choice of the size of the brass tube and by permitting some mismatch in the temperature co-efficients, it is possible to compensate completely for the difference between the temperature co-efficients of linear expansion in the case of this particular embodiment of the invention as depicted in FIGURE 2. Put analytically, this may be expressed as $$-\alpha_S+\alpha_t'=0$$

where $$\alpha_t'=f[\alpha_B, \alpha_C, E_C, E_B, r \text{ and } R]$$

In the case of the second embodiment of the invention, it is not possible with steel to obtain complete compensation unless the temperature co-efficient of linear expansion of the tube is slightly higher than that of the wire. (This is possible by correct choice of the steels.) Nevertheless, even if $\alpha_S$ is the same for both tube and wire, the differential co-efficient will be reduced considerably, as the larger temperature co-efficient of the tube will force the concrete to move more than it would if the protecting tube were not present.

Expressed analytically:

$$-\alpha_S+\alpha_t''\rightarrow 0 \text{ where } \alpha_t''=\phi[\alpha_C, \alpha_S, E_C, E_S, r \text{ and } R]$$

Experimental work has verified that with a gauge constructed as shown in FIGURES 1 and 2, the residual temperature co-efficient of linear expansion, when it is set in concrete, is $0.17\times10^6$ per degree Fahrenheit, which is half an order less than would be expected by considering the wire and concrete alone.

We claim:

1. A vibrating wire strain gauge for embedding in a structure fabricated from concrete or a similar material capable of setting hard, comprising a pair of flanges, a protective metal tube rigidly fixed to said flanges and extending between said flanges, a strain-sensitive element constituted by a wire of ferro-magnetic material enclosed in said tube and sealed in said gauge, said wire being fixed relative to said flanges and being tensioned therebetween, and an electro-magnet adjacent said wire, the dimensions of the tube being chosen in accordance with the formula $$r=t[\xi+\sqrt{\xi(\xi-1)}]$$

where $r$ is the external radius of the tube, $t$ is the wall thickness of the tube, $$\xi=\frac{E_M}{E_C}$$

$E_M$ is the modulus of elasticity of the material of the tube, and $E_C$ is the modulus of elasticity of the structural material.

2. A vibrating wire strain gauge for embedding in a structure fabricated from concrete or similar material as claimed in claim 1 comprising adjusting means by which the tension of the wire can be adjusted from externally of the gauge.

References Cited in the file of this patent
UNITED STATES PATENTS

| | | |
|---|---|---|
| 1,708,333 | Smith | Apr. 9, 1929 |
| 2,148,013 | Carlson | Feb. 21, 1939 |

FOREIGN PATENTS

| | | |
|---|---|---|
| 1,069,588 | France | July 9, 1954 |